July 4, 1939. W. A. ROSS 2,164,348
DRILLING DEVICE
Filed Feb. 24, 1936

Inventor
Warren A. Ross
by Parker & Carter
Attorneys

Patented July 4, 1939

2,164,348

UNITED STATES PATENT OFFICE 2,164,348

DRILLING DEVICE

Warren A. Ross, Haverhill, Mass., assignor to Donald M. Carter, Chicago, Ill.

Application February 24, 1936, Serial No. 65,225

10 Claims. (Cl. 255—71)

This invention relates to drilling devices and has for its object to provide a new and improved device of this description.

The invention has as a further object to provide a drilling device where the cutting edge of the cutter will be maintained at substantially the same thickness throughout the greater part of the life of the cutter as the cutting edge is worn away. The invention has as a further object to provide a cup shaped cutter with a central web.

The invention has further objects which are more particularly pointed out in the accompanying description.

Referring now to the drawing, Fig. 1 is a view of one form of drilling device embodying the invention;

Like numerals refer to like parts throughout the several figures.

Figure 1:
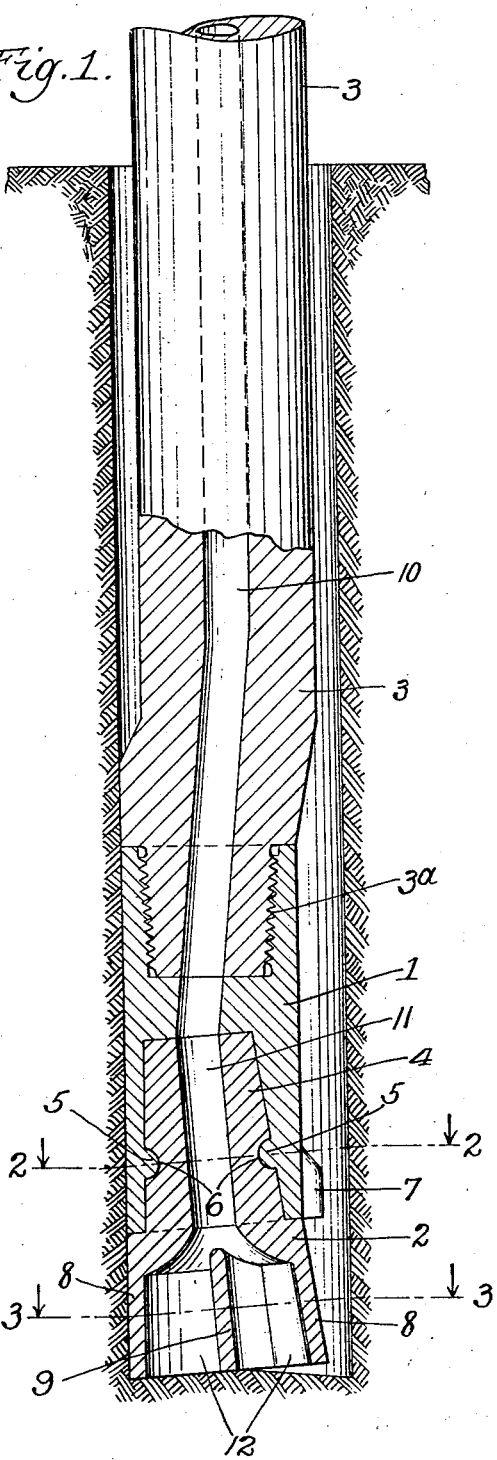
Figure 2:
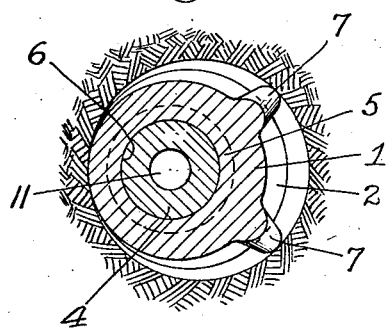
Fig. 2 is a sectional view taken on line 2—2 of Fig. 1.
Figure 3:
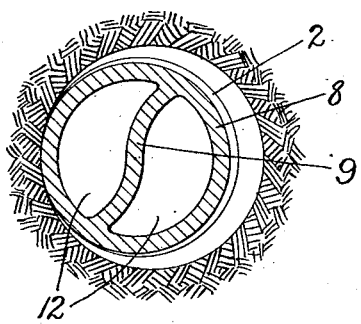
Fig. 3 is a sectional view taken on line 3—3 of Fig. 1.

I have shown in the drawing a particular form of construction of the invention for the purpose of illustrating the important features of the invention and it may be applied in various ways other than that shown in the drawing, the particular form being shown simply to make the invention readily understandable.

In carrying out the invention, I provide a cutter holder 1 which has connected therewith a cutter 2. The cutter holder 1 is connected to the drill pipe 3 in any desired manner, preferably by means of the threaded connection 3a. The cutter 2 may be connected with the cutter holder in any desired manner. In the particular construction illustrated, the cutter 2 is provided with a shank 4 which is rotatably mounted in the cutter holder 1. The shank of the cutter and the cutter holder have cooperating parts which hold the cutter in the cutter holder, but at the same time permit rotation of the cutter in the cutter holder. In the particular construction shown the cutter holder has the projection or annular rib 5 which fits into the annular recess 6 in the shank of the cutter. The cutter holder may be connected with the cutter in any desired manner. I prefer to have it molded, cast or welded around the shank of the cutter, the parts being so connected together that the cutter can freely rotate in the cutter holder.

The cutter holder is provided with one or more lugs 7 which project therefrom and which engage the wall of the hole to act as guides to keep the drill from jumping and to maintain one edge of the cutter against the wall of the hole, as the device is being used. In the particular construction shown the cutter is a hollow cup-shaped cutter having a wall 8 which is substantially the same thickness throughout a large portion of its length so that as it wears off this thickness remains the same. Within the hole of the cutter there is a cross member or partition 9 which is preferably of a more or less S-shape. This cross member or partition when the cutter is rotated, removes the core. This wall or partition is also thin, being preferably substantially about the same thickness as the outside wall of the cutter so that as it wears off, the cutting edge will remain the same thickness. By having this curved or S-shaped inner wall or partition only a very small part of the central cutter or wall will be touching the material to be acted upon at any given time. Also a comparatively small portion of the outside cutting edge is engaging the material acted upon at any given time as the drill revolves.

There is a fluid passageway 10 through the drill pipe 3 and it communicates with a fluid passageway 11 through the shank of the cutter, the fluid passageway 11 communicating with the hollow interior 12 of the cutter.

I have shown one form of the device where there is a single cutter but it is of course evident that a plurality of cutters may be used if desired.

I have described in detail a particular construction embodying the invention but it is of course evident that the parts may be varied in many particulars and some of the parts omitted and others used with parts not here shown without departing from the spirit of the invention as embodied in the claims hereto appended, and I therefore do not limit myself to the particular construction shown.

The use and operation of my invention are as follows:

When the construction shown in Fig. 1 is used, the cutting device is attached to the cutter holder and the cutter holder is attached to the drill pipe. The drill pipe is then rotated and the edge of the cutter cuts away the material acted upon at the edge. The pressure of the cutting edge produces stresses in the material. This tends to loosen the material between the outer cutting edge of the cutter and the interior cutting edge 9, and the interior cutting edge loosens the material and the fluid which is passing down through the passageway 10 forces the loose material thus cut and loosened by the cutter out of the bottom of the cutter and up along the edge of the drill pipe and out at the top of the hole.

Ordinarily a comparatively small area of the cutting edge is engaging the material to be cut at the outside edge of the hole and as the drill pipe revolves, the cutting device is constantly rotating and revolving on the outside of the hole. The lugs 7 keep the cutter in the proper position with relation to the hole and keep the device from jumping. The wall 9 is arranged so that the fluid passing down the passageway 10 passes on opposite sides thereof before passing out of the bottom of the cutter. The drill may be used as a rotary drill or as a percussion drill.

I have illustrated a single cutter in the drawing in order to make the invention clear, but it is of course evident that a plurality of these cutters may be used on the drill rod if desired.

It will be noted that the liquid which removes the cuttings passes down through the passageway in the shank and that the wall 9 divides this liquid so as to distribute it around the hollow of the cup.

I claim:

1. A well drilling device comprising a hollow cup shaped cutter having an outer wall, the free edge of which forms a cutting edge for cutting the material at the bottom of the hole, a cross member extending across the cup shaped cutter, the lower edge of which is substantially on a level with the edge of the hollow cup shaped cutter at the point where it meets such edge and which forms an additional cutting edge.

2. A well drilling device comprising a hollow cup shaped cutter having an outer wall, the free edge of which forms a cutting edge for cutting the material at the bottom of the hole, a cross member extending across the cup shaped cutter, the lower edge of which is substantially on a level with the edge of the hollow cup shaped cutter at the point where it meets such edge and which forms an additional cutting edge, and means for directing fluid through the hollow of the cutter on opposite sides of said wall.

3. A well drilling device comprising a hollow cup shaped cutter having an outer wall, the free edge of which forms a cutting edge for cutting the material at the bottom of the hole, a cross member extending across the cup shaped cutter, the lower edge of which is substantially on a level with the edge of the hollow cup shaped cutter at the point where it meets such edge and which forms an additional cutting edge, said cross member having reversely curved walls.

4. A well drilling device comprising a hollow cup shaped cutter having an outer wall, the free edge of which forms a cutting edge for cutting the material at the bottom of the hole, an S-shaped cross member integral with the cup shaped member and extending thereacross, the lower edge of which forms an additional cutting edge.

5. A well drilling device comprising a hollow cup shaped cutter having an elongated wall, the lower end of which is free from teeth, the free edge of which forms a cutting edge for cutting the material at the bottom of the hole, a cutter holder with which said cutter is rotatably mounted, and separated non-cutting projecting parts on the cutter holder for engaging the wall of the hole and projecting beyond the periphery of the cutter holder.

6. A well drilling device comprising a hollow cup shaped cutter having an elongated wall, the free edge of which forms a cutting edge for cutting the material at the bottom of the hole, said cutter provided with a shank projecting therefrom, a hollow cutter holder into which said shank is received, a projection on the interior of said hollow cutter holder and an annular recess in said shank into which said projection is rotatably received, whereby the cutter is free to rotate with relation to the cutter holder and is held against removal therefrom.

7. A well drilling device comprising a hollow cup shaped cutter having an elongated wall, the lower end of which is free from teeth, the free edge of which forms a cutting edge for cutting the material at the bottom of the hole, a cutter holder with which said cutter is rotatably mounted and two separated non-cutting projecting parts projecting from the cutter holder and engaging the wall of the hole at separated points, the portion of the cutter holder opposite said projections having a continuous non-cutting surface and being held in engagement with the wall of the hole by said projecting parts so as to maintain the cutter in proper position.

8. A well drilling device comprising a rotary drill pipe, a cup shaped cutter carried by said drill pipe and arranged to cut a cylindrical hole upon rotation and longitudinal feed of the drill pipe, for the drill pipe to go in to, said cutter having a comparatively thin wall, the edge of the wall forming a cutting edge, and an additional cutting edge extending across the hollow cutter, the cutting edge of which is substantially on a level with the outer cutting edge of the hollow cup shaped cutter at the point where it meets said edge, for removing the central portion of the material forming the hole.

9. A well drilling device comprising a rotary drill pipe, a cup shaped cutter carried by said drill pipe and arranged to cut a cylindrical hole upon rotation and longitudinal feed of the drill pipe, for the drill pipe to go in to, said cutter having a comparatively thin wall, the edge of the wall forming a cutting edge, and an additional cutting edge extending across the hollow cutter, the cutting edge of which is substantially on a level with the outer cutting edge of the hollow cup shaped cutter at the point where it meets said edge, for removing the central portion of the material forming the hole, and means for maintaining one edge of the cutter against the wall of the hole.

10. A well drilling device comprising a hollow cup shaped cutter having an elongated wall, the free edge of which forms a cutting edge and which remains substantially the same thickness as it wears away when the cutter is in use, an additional cutting edge extending across the hollow cutter and integral therewith and having its cutting edge substantially in the same plane as the outer cutting edge of the cutter, a shank connected with said cutter, a passageway through said shank for the liquid which removes the cuttings, and means for dividing the flow of the liquid as it passes from said shank into the hollow of the cup on both sides of said additional cutting edge, so as to distribute it around the cup.

WARREN A. ROSS.